(114.)

R. J. MILLER.

Improvement in Plows.

No. 122,956.

Patented Jan. 23, 1872.

Witnesses:
A. Bennenendorf.
Francis McArdle.

Inventor:
R. J. Miller
PER
Mmmy
Attorneys.

UNITED STATES PATENT OFFICE.

RICHARD J. MILLER, OF SHERMAN, IOWA.

IMPROVEMENT IN PLOWS.

Specification forming part of Letters Patent No. 122,956, dated January 23, 1872.

Specification describing certain Improvements in Draft-Adjusting Apparatus for Plows, invented by RICHARD J. MILLER, of Sherman, in the county of Poweshiek and State of Iowa.

My invention consists of a vertically-swinging arm at the end of the plow-beam, to the swinging end of which the whiffletree is connected, which arm has an eccentric pulley or a segment thereof connected to its axis; and a chain extends from said pulley to another on a hand-lever near the rear of the plow in such manner that by pulling the lever backward the arm to which the whiffletree is connected will be forced downward, which will cause the plow to run shallower, and by allowing the lever to swing forward by the action of the draft the said arm will be raised by the draft and the plow caused to run deeper. A graduated notched plate and a holding-pawl are provided in connection with the lever to hold the latter in the required position.

Figure 1:
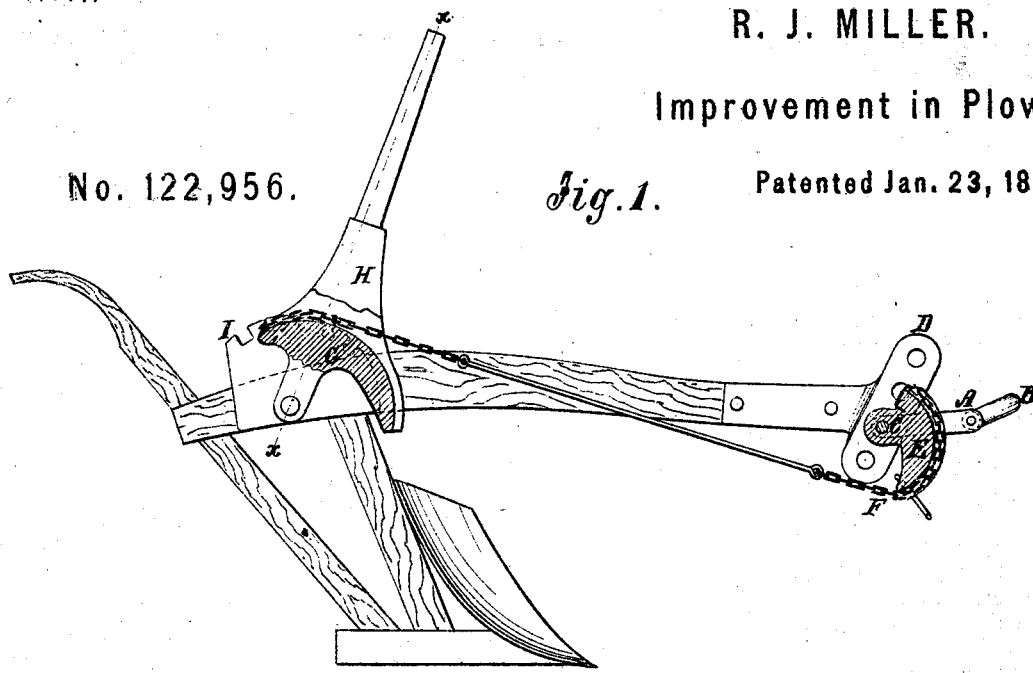
Figure 3:
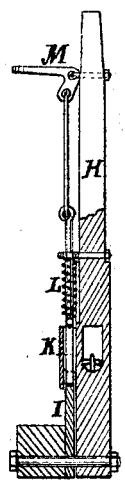
Figure 2:
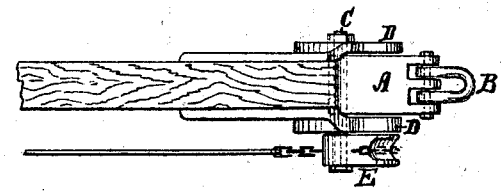

Figure 1 is a side elevation of a plow with my improved draft-regulating apparatus, which is partly shown in section. Fig. 2 is a partial plan view; and Fig. 3 is a section on the line $x\ x$ of Fig. 1.

A represents the arm, to which the whiffletree is to be connected at one end by a clevis, B, or other suitable device. This arm is pivoted to the beam at the rear end, as shown at C, between two long vertical ears, D, having a series of holes at different heights for shifting the pivot from time to time to vary the draft. But for also varying the draft while the plow is in operation, the pivot C of arm A is provided at one end with a segment, E, of a grooved eccentric pulley, on which a chain, F, which is also connected with a similar pulley, G, on the lever H, is so arranged that when said lever is pulled backward the end of arm A, to which the draft is connected, will be forced downward to cause the plow to rise. The forward movement of said lever sets the arm free to be raised by the draft so that the plow will run deeper. I is a notched plate, and K a holding-pawl, arranged with the lever to lock the latter in a required position. This pawl is provided with a spring, L, to hold it in the notches of plate I, and a bell-crank, M, for pulling it out; but this locking device is in common use, and I do not claim it.

I am aware that devices which allow the clevis of a plow to be adjusted by the plowman without leaving his post between the stilts is not new; but What I esteem to be of my invention, and desire to protect by Letters Patent, is—

The combination of pivoted clevis-arm A B C, ears D D, and eccentric pulley E, when these parts are constructed and applied to the beam, in connection with operative mechanism at the rear of the plow, as and for the purpose set forth.

RICHARD J. MILLER.

Witnesses:
ANGUS McDONALD,
JOHN MILLER.